United States Patent
Han

(10) Patent No.: US 9,747,235 B2
(45) Date of Patent: Aug. 29, 2017

(54) INFORMATION PROCESSING METHOD AND ELECTRONIC DEVICE

(71) Applicant: Lenovo (Beijing) Co., Ltd., Beijing (CN)

(72) Inventor: Shuang Han, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/974,279

(22) Filed: Dec. 18, 2015

(65) Prior Publication Data
US 2017/0060797 A1    Mar. 2, 2017

(30) Foreign Application Priority Data
Aug. 31, 2015    (CN) .......................... 2015 1 0548425

(51) Int. Cl.
| | | |
|---|---|---|
| G06T 15/00 | (2011.01) | |
| G06F 13/38 | (2006.01) | |
| G09G 5/22 | (2006.01) | |
| G09G 5/00 | (2006.01) | |
| G06F 13/42 | (2006.01) | |

(52) U.S. Cl.
CPC ........ *G06F 13/385* (2013.01); *G06F 13/4282* (2013.01); *G09G 5/005* (2013.01); *G09G 5/227* (2013.01); *G09G 2340/0407* (2013.01); *G09G 2354/00* (2013.01)

(58) Field of Classification Search
CPC ........ G06T 3/4092; G06F 3/14; G06F 3/023; G09G 5/005; G09G 3/20; G09G 5/003; H04N 21/42653; H04N 5/44508
USPC .......................................................... 345/428
See application file for complete search history.

(56) References Cited

U.S. PATENT DOCUMENTS

| | | | | |
|---|---|---|---|---|
| 6,670,964 B1* | 12/2003 | Ward | ..................... | G09G 5/005 345/3.1 |
| 7,982,740 B2* | 7/2011 | Tang | ................... | H04N 5/44508 345/419 |
| 8,026,924 B2* | 9/2011 | Kim | .......................... | G06F 3/14 345/418 |
| 8,199,154 B2* | 6/2012 | Tang | ................ | H04N 21/42653 345/428 |
| 8,325,824 B2* | 12/2012 | Kim | ...................... | G09G 5/003 375/240.26 |
| 8,411,118 B2* | 4/2013 | Sheu | ........................ | G09G 3/20 345/698 |
| 8,441,474 B2* | 5/2013 | Nedeljkovic | ............. | G06F 3/14 345/418 |
| 8,533,366 B2* | 9/2013 | Ichieda | ...................... | G06F 3/14 345/1.1 |
| 8,976,210 B2* | 3/2015 | Heyman | ............... | G06T 3/4092 345/156 |

(Continued)

*Primary Examiner* — Phu K Nguyen
(74) *Attorney, Agent, or Firm* — Harness, Dickey & Pierce, P.L.C.

(57) ABSTRACT

An information processing method and an electronic device are provided, the information processing method includes: detecting a version parameter of a first USB device connected to an electronic device; detecting a display resolution of the electronic device; determining whether the version parameter and the display resolution meet a predetermined conflict condition; and adjusting the display resolution of the electronic device in a case that the version parameter and the display resolution meet the predetermined conflict condition.

14 Claims, 5 Drawing Sheets

(56) References Cited

U.S. PATENT DOCUMENTS 9,378,703 B2 * 6/2016 Nakano ................ G06F 3/023

* cited by examiner

INFORMATION PROCESSING METHOD AND ELECTRONIC DEVICE

CROSS REFERENCE OF RELATED APPLICATION

The present application claims the priority to Chinese Patent Application No. 201510548425.0, titled "INFORMATION PROCESSING METHOD AND ELECTRONIC DEVICE", filed on Aug. 31, 2015 with the State Intellectual Property Office of the PRC, which is incorporated herein by reference in its entirety.

FIELD

The disclosure relates to the field of electronic technologies, and in particular to an information processing method and an electronic device.

BACKGROUND

With the advancement of electronic technologies, an electronic device gets higher in resolution and therefore may display images with higher resolution, thereby providing a user with a better viewing experience. For example, a 4 k television is known from the conventional art which may have a resolution of 3840×2160 pixels. However, in some cases, a data transmission rate of a peripheral USB device connected to the electronic device capable of displaying high resolution images is very slow, which may result in abnormal operations of the USB device.

SUMMARY

In view of this, it is an object of the present disclosure to provide an information processing method and an electronic device to reduce abnormal operations of a USB device and provide a more intelligent electronic device.

The following technical solutions are provided according to the present disclosure to achieve the above object.

In an aspect, an information processing method is provided according to the embodiment of the disclosure, the information processing method includes:

detecting a version parameter of a first USB device connected to an electronic device;

detecting a display resolution of the electronic device;

determining whether the version parameter and the display resolution meet a predetermined conflict condition; and adjusting the display resolution of the electronic device in a case that the version parameter and the display resolution meet the predetermined conflict condition.

Based on the above technical solution, the adjusting the display resolution of the electronic device in a case that the version parameter and the display resolution meet the predetermined conflict condition may include:

outputting prompt information for adjusting the display resolution;

receiving a user response corresponding to the prompt information; and adjusting the display resolution of the electronic device based on the user response.

Based on the above technical solutions, the information processing method may further include:

determining whether a second USB device meeting the predetermined conflict condition with the display resolution is connected to the electronic device before the first USB device is connected to the electronic device; and maintaining the display resolution of the electronic device in a case that the second USB device meeting the predetermined conflict condition with the display resolution is connected to the electronic device before the first USB device is connected to the electronic device.

Based on the above technical solutions, the adjusting the display resolution of the electronic device in a case that the version parameter and the display resolution meet the predetermined conflict condition may include:

checking a historical processing record for the predetermined conflict condition; and adjusting the display resolution of the electronic device based on the historical processing record.

Based on the above technical solutions, the electronic device may include a central processing unit and a display unit;

the determining whether the version parameter and the display resolution meet a predetermined conflict condition may include:

determining, by the central processing unit, whether the version parameter and the display resolution meet the predetermined conflict condition; and the adjusting the display resolution of the electronic device in a case that the version parameter and the display resolution meet the predetermined conflict condition may include:

controlling, by the central processing unit, the display unit to adjust the display resolution in a case that the version parameter and the display resolution meet the predetermined conflict condition.

Based on the above technical solutions, the electronic device may include a display unit, and the display unit may include an image processing module;

the determining whether the version parameter and the display resolution meet a predetermined conflict condition may include:

receiving, by the image processing module, the version parameter from an identifying sub-module and determining, by the image processing module, whether the version parameter and the display resolution meet the predetermined conflict condition; and the adjusting the display resolution of the electronic device in a case that the version parameter and the display resolution meet the predetermined conflict condition may include:

adjusting, by the image processing module, the display resolution of the electronic device in a case that the version parameter and the display resolution meet the predetermined conflict condition.

Based on the above technical solutions, the electronic device may include a display unit; and the display unit may include a USB processing module;

the detecting a version parameter of a first USB device connected to an electronic device may include:

reading, by a reading sub-module of the USB processing module, configuration information of the first USB device; and identifying, by an identifying sub-module of the USB processing module, the configuration information of the first USB device to acquire the version parameter of the first USB device.

In another aspect, an electronic device is provided according to the embodiment of the disclosure, the electronic device includes:

a first detecting unit configured to detect a version parameter of a first USB device connected to the electronic device;

a second detecting unit configured to detect a display resolution of the electronic device;

a first determining unit configured to determine whether the version parameter and the display resolution meet a predetermined conflict condition; and an adjusting unit configured to adjust the display resolution of the electronic device in a case that the version parameter and the display resolution meet the predetermined conflict condition.

Based on the above technical solution, the adjusting unit may be configured to: output prompt information for adjusting the display resolution; receive a user response corresponding to the prompt information; and adjust the display resolution of the electronic device based on the user response.

Based on the above technical solutions, the electronic device may further include:

a second determining unit configured to determine whether a second USB device meeting the predetermined conflict condition with the display resolution is connected to the electronic device before the first USB device is connected to the electronic device; where the adjusting unit may further be configured to maintain the display resolution of the electronic device in a case that the second USB device meeting the predetermined conflict condition with the display resolution is connected to the electronic device before the first USB device is connected to the electronic device.

Based on the above technical solutions, the adjusting unit may be configured to: check a historical processing record for the predetermined conflict condition; and adjust the display resolution of the electronic device based on the historical processing record.

Based on the above technical solutions, the electronic device may include a central processing unit and a display unit; and the first determining unit may include the central processing unit; where the central processing unit may be configured to: determine whether the version parameter and the display resolution meet the predetermined conflict condition; and control the display unit to adjust the display resolution in a case that the version parameter and the display resolution meet the predetermined conflict condition.

Based on the above technical solutions, the electronic device may include a display unit; the display unit may include an image processing module; and the first determining unit may include the image processing module; where the image processing module may be configured to: receive the version parameter from an identifying sub-module; determine whether the version parameter and the display resolution meet the predetermined conflict condition; and adjust the display resolution of the electronic device in a case that the version parameter and the display resolution meet the predetermined conflict condition.

Based on the above technical solutions, the electronic device may include a display unit; the display unit may include a USB processing module; and the first detecting unit may include the USB processing module; where the USB processing module may include:

a reading sub-module configured to read configuration information of the first USB device; and an identifying sub-module configured to identify the configuration information of the first USB device to acquire the version parameter of the first USB device.

With the information processing method and the electronic device according to the embodiments of the disclosure, the version parameter of the USB device and the display resolution of the electronic device are detected, and the display resolution may be adjusted in a case that the version parameter of the USB device and the display resolution meet the predetermined conflict condition, thereby reducing the situation where the USB device is unusable due to the version parameter of the USB device conflicting with the display resolution, thus a more intelligent electronic device may be provided and user satisfaction may be improved.

DETAILED DESCRIPTION OF THE EMBODIMENTS

Hereinafter technical solutions of the present disclosure are described in detail in connection with embodiments with reference to the accompanying drawings.

A First Method Embodiment

Figure 1:
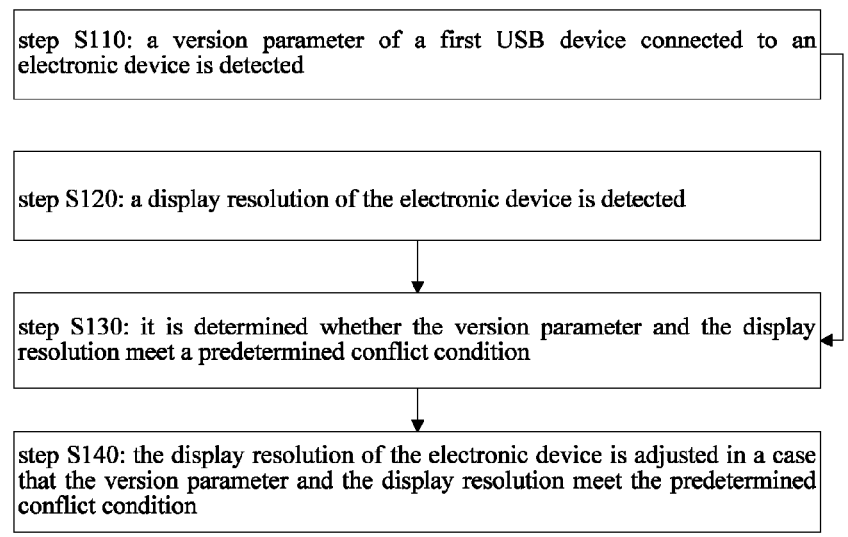
FIG. 1 is a schematic flow chart of an information processing method according to an embodiment of the disclosure.

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

The information processing method according to the embodiment is applicable to various electronic devices such as a desktop computer, a laptop computer, a tablet, a network television or a cell phone.

The first USB device is a device including a USB plug. The first USB device generally refers to any of various types of USB devices the version parameters of which may include USB 1.0, USB 2.0, USB 3.0, USB Type-C and the like. The version parameter indicates a version of the USB specification to which the USB device confirms. The USB device described in this embodiment may specifically be a device including the USB plug, such as a USB flash disk or a removable hard disk.

In this embodiment, the electronic device detects the version parameter of the first USB device.

In step S120, a current display resolution of the electronic device is detected. The display resolution indicates a resolution at which a display screen displays an image. Resolution refers to the number of pixels a display screen displays, and is indicated as the number of pixels in the horizontal direction by the number of pixels in the vertical direction in a viewable area of the display screen. For example, a resolution of 800×600 indicates that 800 pixels in the horizontal direction and 600 pixels in the vertical direction are displayed in the entire display screen. The display resolution of the electronic device may include typical 4 k resolution which indicates a resolution of 4096× 2160, that is, 4096 pixels in the horizontal direction and 2160 pixels in the vertical direction are displayed in the display screen.

In step S130, it is determined whether the current display resolution of the electronic device and the version parameter of the first USB device meet the predetermined conflict condition. In a case that the current display resolution of the electronic device is a specific resolution, for example in a case that the current display resolution of the electronic device is 4K resolution, 4K video data and data from a USB 3.0 device may be transmitted through a same specific set of transmission paths in the electronic device. Therefore, in a case that the current display resolution of the electronic device is 4K resolution, the data from the USB 3.0 device can not be transmitted through the specific set of transmission paths which is already occupied by the 4K video data, which results in abnormal operations of the USB 3.0 device.

In the embodiment, it may be determined in step S130 whether the version parameter of the first USB device currently connected to the electronic device and the current display resolution of the electronic device meet the predetermined conflict condition. In a case that the version parameter of the first USB device currently connected to the electronic device and the current display resolution of the electronic device meet the predetermined conflict condition, the display resolution of the electronic device is adjusted in step S140 to ensure the normal operation of the first USB device. After the display resolution of the electronic device is adjusted, there is no longer a conflict between the display resolution of the electronic device and the version parameter of the first USB device, thus the electronic device and the first USB device are able to operate normally.

A Second Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

Step S140 may include:

outputting prompt information for adjusting the display resolution;

receiving a user response corresponding to the prompt information; and adjusting the display resolution of the electronic device based on the user response.

In this embodiment, in order to enable an enhanced control by a user such that the display resolution may be adjusted based on the demand of the user, the prompt information for adjusting the display resolution of the electronic device is outputted. The prompt information may be displayed or outputted in speech form.

The electronic device may also receive the user response by detecting an input from a keyboard or a touch screen, where the user response indicates whether the user currently wishes to adjust the display resolution of the electronic device.

The display resolution of the electronic device is adjusted in a case that the user response indicates that the user instructs or agrees to adjust the display resolution.

In particular, the electronic device may display a prompt information dialog box, and adjust the display resolution in a case that it is received the user response indicating the user clicks or choose a user control showing "confirm" or "agree", which indicates that the user agrees to adjust the display resolution, thus the conflict between the display resolution of the electronic device and the version parameter may be avoided.

As can be seen that, on the basis of the first method embodiment, an information processing method in which it is determined whether to adjust the display resolution through an interaction with the user. The method is easy to implement. With this method, user satisfaction can be improved.

A Third Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

Figure 2:
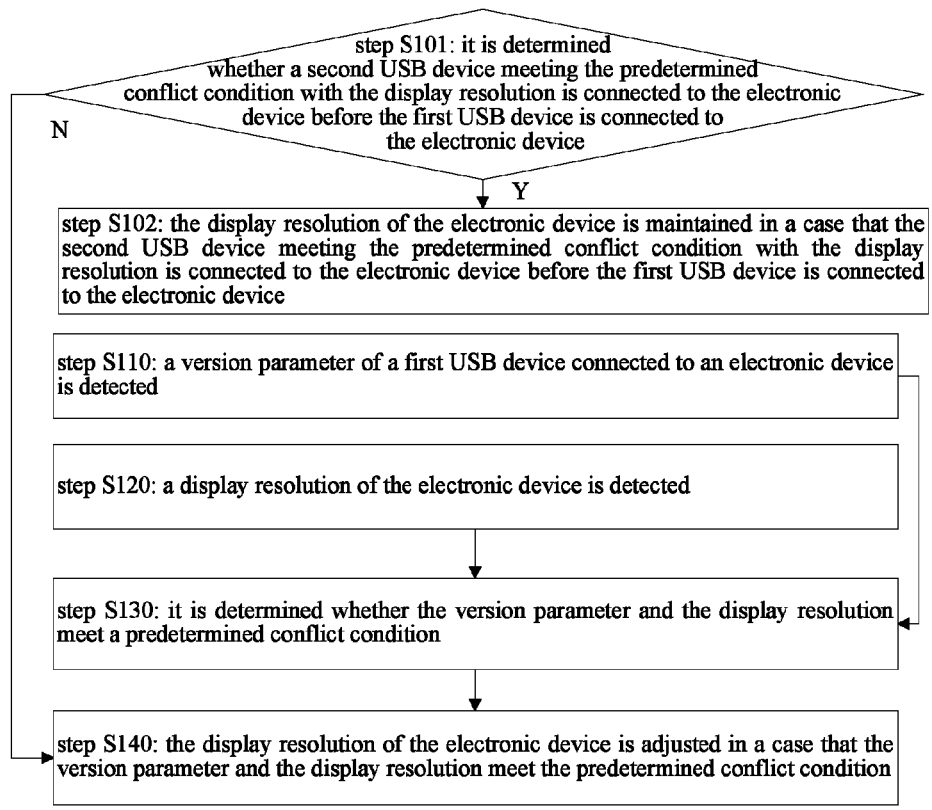
FIG. 2 is a schematic flow chart of an information processing method according to another embodiment of the disclosure.

As shown in FIG. 2, the information processing method further includes the following steps S101 and S102.

In step S101, it is determined whether a second USB device meeting the predetermined conflict condition with the display resolution is connected to the electronic device before the first USB device is connected to the electronic device.

In step S102, the display resolution of the electronic device is maintained in a case that the second USB device meeting the predetermined conflict condition with the display resolution is connected to the electronic device before the first USB device is connected to the electronic device.

In a specific implementation, step 140 is executed in a case that the second USB device meeting the predetermined conflict condition with the display resolution is not connected to the electronic device before the first USB device is connected to the electronic device.

In the embodiment, in a case that another USB device i.e. the second USB device is connected to the electronic device before the first USB device is connected to the electronic device, it is determined whether a version parameter of the second USB device conflicts with the display resolution of the electronic device, and if it is determined that the version parameter of the second USB device conflicts with the display resolution of the electronic device, it is apparently indicated that the user does not wish to adjust the display resolution of the electronic device. Therefore, in step S102, the display resolution of the electronic device is maintained in compliance with the user's desire even if it is determined that the version parameter of the first USB device conflicts with the display resolution of the electronic device.

In the embodiment, whether to adjust the display resolution is determined based on the USB devices currently connected to the electronic device. Therefore, a more intelligent electronic device is provided according to the embodiment.

For example, in a case that the current display resolution of the electronic device is 4K resolution, both the first USB device and the second USB device are USB 3.0 devices, and the second USB device is already plugged into the electronic device before the first USB device is plugged into the electronic device, the electronic device determines that the user does not wish to reduce the display resolution of the electronic device and the display resolution of the electronic device is maintained at 4K resolution.

A Fourth Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

Step S140 may include:

checking a historical processing record for the predetermined conflict condition; and adjusting the display resolution of the electronic device based on the historical processing record.

In this embodiment, a processing record for processes performed in a case that the version parameter of the USB device and the display resolution meet the predetermined conflict condition is recorded by the electronic device. By checking the processing record, the number of times the display resolution of the electronic device is adjusted in a case that the version parameter of the USB device and the display resolution meet the predetermined conflict condition during a first period before the current time instant may be determined. And the display resolution of the electronic device is adjusted in a case that the determined number of times is greater than a predetermined number of times. In this way, the probability of the user currently wishing to adjust the display resolution may be determined by checking the historical processing record, and the display resolution may be adjusted or maintained accordingly. Therefore, the hardware/software resources of the electronic device may be better utilized, a more intelligent electronic device may be provided and user satisfaction may be improved.

A Fifth Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

The electronic device includes a central processing unit and a display unit.

Step S130 may include: determining, by the central processing unit, whether the version parameter and the display resolution meet the predetermined conflict condition.

Step S140 may include: controlling, by the central processing unit, the display unit to adjust the display resolution in a case that the version parameter and the display resolution meet the predetermined conflict condition.

In this embodiment, the electronic device includes the central processing unit. The central processing unit may be a central processor or processing chip. The central processing unit determines whether the version parameter and the display resolution meet the predetermined conflict condition. In this case, the display unit has to transmit its display resolution to the central processing unit.

In step S140, the central processing unit controls the display unit to adjust the display resolution by sending a control instruction to the display unit in a case that the version parameter and the display resolution meet the predetermined conflict condition.

In this embodiment, a method for controlling the display unit to adjust the display resolution is provided which allows a simple implementation.

A Sixth Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

The electronic device includes a display unit, and the display unit includes an image processing module.

Step S130 may include: receiving, by the image processing module, the version parameter from an identifying sub-module and determining, by the image processing module, whether the version parameter and the display resolution meet the predetermined conflict condition.

Step S140 may include: adjusting, by the image processing module, the display resolution of the electronic device in a case that the version parameter and the display resolution meet the predetermined conflict condition.

The difference between the sixth method embodiment and the fifth method embodiment is that: in this embodiment, the image processing module performs the determination and the control on adjustment of the display resolution. In this way, a time delay due to transmissions of the display resolution and the control instruction between the display unit and the central processing unit may be avoided, thus the response rate may be increased.

A Seventh Method Embodiment

As shown in FIG. 1, an information processing method is provided according to the embodiment. The information processing method includes the following steps S110 to S140.

In step S110, a version parameter of a first USB device connected to an electronic device is detected.

In step S120, a display resolution of the electronic device is detected.

In step S130, it is determined whether the version parameter and the display resolution meet a predetermined conflict condition.

In step S140, the display resolution of the electronic device is adjusted in a case that the version parameter and the display resolution meet the predetermined conflict condition.

The electronic device includes a display unit; and the display unit includes a USB processing module.

Step S110 may include:

reading, by a reading sub-module of the USB processing module, configuration information of the first USB device; and identifying, by an identifying sub-module of the USB processing module, the configuration information of the first USB device to acquire the version parameter of the first USB device.

In this embodiment, the display unit is provided with the USB processing module, the USB processing module may include components such microchips. The configuration information of the first USB device is read by the reading sub-module of the USB processing module, and is parsed and identified by the identifying sub-module of the USB processing module to acquire the version parameter of the first USB device.

In this embodiment, a method for acquiring the version parameter of the first USB device is provided, which allows a simple implementation and an intelligent operation.

In this embodiment, the display unit performs both the determination whether the predetermined conflict condition is met and the control on adjustment of the display resolution performed by the image processing module in the sixth embodiment. Since the version parameter of the first USB device is also acquired by the display unit, the display unit may determine whether the predetermined conflict condition is met and further determine whether to adjust the display resolution more rapidly.

A First Device Embodiment

Figure 3:
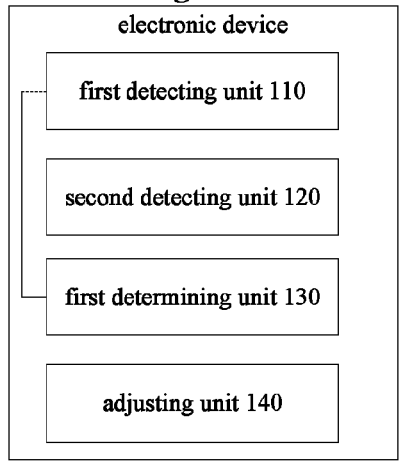
FIG. 3 is a schematic structural diagram of an electronic device according to an embodiment of the disclosure.

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

In this embodiment, the first detecting unit 110, the first determining unit 130 and the adjusting unit 140 include processors or processing circuits. The processors may include processing chips or sets of electronic components having an information processing function such as application processors, central processors, microprocessors, digital signal processors or programmable arrays. The processing circuits may include application specific integrated circuits.

The second detecting unit 120 may include a storage medium storing parameters such as the display resolution of the electronic device. Of course, the second detecting unit 120 may also include a processor or a processing circuit configured to acquire the display resolution of the electronic device by reading the parameters stored in the storage medium. In this case, the acquired display resolution is a current display resolution of the electronic device.

In this embodiment, the first detecting unit 110, the first determining unit 130, the adjusting unit 140 and the second detecting unit 120 may correspond to different processors or processing circuits respectively, or may be integrated into a same processor or processing circuit.

The electronic device may be a cell phone, a tablet, a television or a wearable device. The electronic device may include a display unit including various kinds of display screens such as a 4K display screen. The electronic device may also include a USB socket for receiving a USB plug of a USB device.

In summary, the electronic device according to the embodiment may determine whether the version parameter of the first USB device and the current display resolution of the electronic device meet the predetermined conflict condition and adjust the display resolution of the electronic device in a case that the version parameter of the first USB device and the current display resolution of the electronic device meet the predetermined conflict condition, thereby avoiding conflict and enabling normal operation of the first USB device.

A Second Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The adjusting unit 140 is configured to: output prompt information for adjusting the display resolution; receive a user response corresponding to the prompt information; and adjust the display resolution of the electronic device based on the user response.

In this embodiment, the adjusting unit 140 interacts with the user by outputting the prompt information and determine whether or how to adjust the display resolution based on the user response. Specifically, the adjusting unit 140 may include an interaction module. The interaction module may include a display interaction screen configured to display the prompt information and receive the user response corresponding to the prompt information. Alternatively, the interaction module may include a speech interaction component, such as a speech player and a speech collector, configured to output the prompt information in speech form and collect a speech input from the user to receive the user response.

Of course, the adjusting unit 140 may also include information processing components such as processors or processing circuits for controlling the adjustment of the display resolution of the electronic device based on the user response.

For example, the user response may include an instruction associated with whether to adjust the display resolution and what an adjusted display resolution is, etc.

The electronic device according to this embodiment has further improvement made on the basis of the electronic device according to the first device embodiment. The conflict between the display resolution of the electronic device and the version parameter of the first USB device may be solved by adjusting the display resolution based on the interaction with the user.

A Third Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The adjusting unit 140 is configured to: output prompt information for adjusting the display resolution; receive a user response corresponding to the prompt information; and adjust the display resolution of the electronic device based on the user response.

The electronic device further include: a second determining unit configured to determine whether a second USB device meeting the predetermined conflict condition with the display resolution is connected to the electronic device before the first USB device is connected to the electronic device.

The adjusting unit 140 is further configured to maintain the display resolution of the electronic device in a case that the second USB device meeting the predetermined conflict condition with the display resolution is connected to the electronic device before the first USB device is connected to the electronic device.

In this embodiment, the second determining unit is additionally provided, the structure of which may refer to that of the first determining unit. With the second determining unit, it can be determined whether another USB device, i.e., the second USB device is connected to the electronic device before the first USB device is connected to the electronic device. In a case that the version parameter of the second USB device also meets the predetermined conflict condition with the display resolution of the electronic device, the display resolution of the electronic device is not adjusted after the first USB device is connected to the electronic device. In this way, a current intention of the user may be presumed by additionally providing the second determining unit, thus a more intelligent electronic device may be provided and user satisfaction may be improved.

A Fourth Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The adjusting unit 140 is configured to: check a historical processing record for the predetermined conflict condition; and adjust the display resolution of the electronic device based on the historical processing record.

In this embodiment, the adjusting unit 140 may include a storage medium for storing the historical processing record. The adjusting unit 140 may determine whether to adjust the display resolution and determine adjustment parameters such as an adjusted resolution by reading the historical processing record and adjustment settings stored in the storage medium.

The electronic device according to the embodiment may solve the conflict between the display resolution of the electronic device and the version parameter of the first USB device by performing operations based on the historical processing record, thus a more intelligent electronic device may be provided and user satisfaction may be improved.

A Fifth Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The electronic device includes a central processing unit and a display unit; and the first determining unit 130 includes the central processing unit.

The central processing unit is configured to: determine whether the version parameter and the display resolution meet the predetermined conflict condition; and control the display unit to adjust the display resolution in a case that the version parameter and the display resolution meet the predetermined conflict condition.

The central processing unit in this embodiment may include processing component such as a central processing unit CUP of the electronic device.

In this embodiment, the CPU of the electronic device determines whether the version parameter and the display resolution meet the predetermined conflict condition. In this way, no additional processing chips or processing circuits are needed to perform the determination.

In practice, the adjusting unit 140 may also include the central processing unit, such as the CPU. The central processing unit generates a control instruction for controlling the adjustment of the display resolution based on the determination result and sends the control instruction to the processing chip of the display screen of the electronic device, thus the display resolution may be adjusted and the conflict between the display resolution of the electronic device and the version parameter of the first USB device may be avoided conveniently.

A Sixth Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The electronic device includes a display unit, the display unit includes an image processing module; and the first determining unit includes the image processing module.

The image processing module is configured to: receive the version parameter from an identifying sub-module; determine whether the version parameter and the display resolution meet the predetermined conflict condition; and adjust the display resolution of the electronic device in a case that the version parameter and the display resolution meet the predetermined conflict condition.

The display unit includes a display screen which may be a display component such as a LCD display, an electronic ink display or a projection screen. In this embodiment, the display unit includes an image processing module which may include an image processing chip such as a Scalar chip.

In this embodiment, the image processing module included in the display unit determines whether the predetermined conflict condition is met and controls the adjustment of the display resolution, thus a transmission time delay may be avoided and the number of paths needed for transmitting signals may be reduced.

A Seventh Device Embodiment

As shown in FIG. 3, an electronic device is provided according to the embodiment. The electronic device includes:

a first detecting unit 110 configured to detect a version parameter of a first USB device connected to the electronic device;

a second detecting unit 120 configured to detect a display resolution of the electronic device;

a first determining unit 130 configured to determine whether the version parameter and the display resolution meet a predetermined conflict condition; and an adjusting unit 140 configured to adjust the display resolution of the electronic device in a case that the version parameter and the display resolution meet the predetermined conflict condition.

The electronic device includes a display unit.

The display unit includes a USB processing module; and the first detecting unit includes the USB processing module;

The USB processing module includes:

a reading sub-module configured to read configuration information of the first USB device; and an identifying sub-module configured to identify the configuration information of the first USB device to acquire the version parameter of the first USB device.

The electronic device according to the embodiment has further improvement made on the basis of any one of the electronic device according to the first device embodiment to the electronic device according to the sixth device embodiment. The structure of the adjusting unit 140 may refer to any one of the first device embodiment to the sixth device embodiment.

In this embodiment, the USB processing module is additionally provided in the display unit of the electronic device. The USB processing module may include a micro-controller. The USB processing module may further include the reading sub-module which may read configuration information of the USB device and the identifying sub-module which may acquire the version parameter of the USB device. In this way, there is no need for a system of the electronic device to read and identify the configuration information of the USB device. In this way, the number of paths need for transmitting information during acquiring the version parameter may be reduced and associated time delay may be reduced.

Hereinafter, three examples are provided in conjunction with any one of the above embodiments.

A First Example

Figure 4:
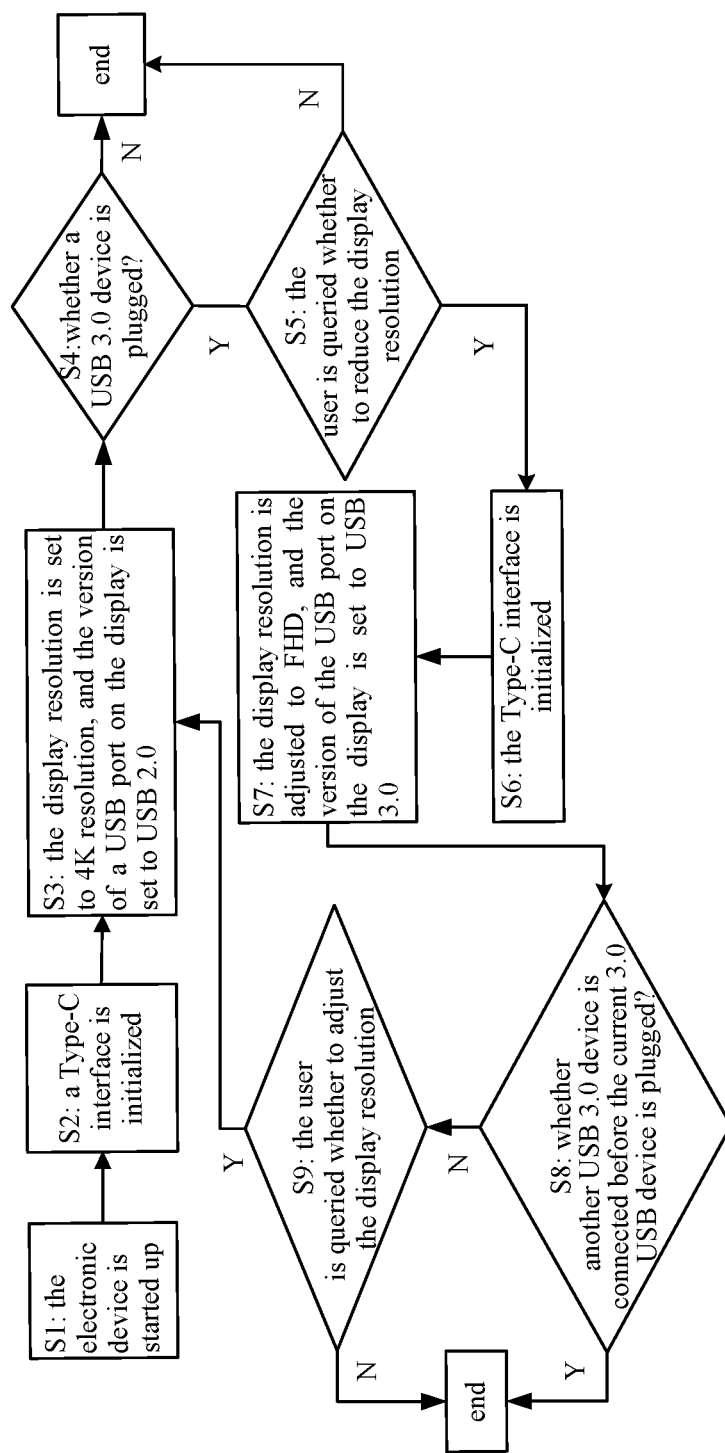
FIG. 4 is a schematic flow chart of an information processing method according to another embodiment of the disclosure.

As shown in FIG. 4, an information processing method in the example includes the following steps S1 to S9.

In step S1, the electronic device is started up for operation. The electronic device may include a cell phone, a television.

In step S2, a Type-C interface is initialized. The Type-C interface is a type or version of USB interface.

In step S3, the display resolution of the electronic device is set to 4K resolution, and the version of a USB port on the display of the electronic device is set to USB 2.0 by a system of the electronic device.

In step S4, it is determined whether a USB 3.0 device is plugged; step S5 is executed in a case that the USB 3.0 device is plugged; or else, the procedure is terminated.

In step S5, the user is queried whether he/she wishes to reduce the display resolution; step S6 is executed in a case that the user wishes to reduce the display resolution; or else, the procedure is terminated. S5 corresponds to outputting the prompt information for adjusting the display resolution in the above embodiments.

In step S6, the Type-C interface is initialized. In this case, the version of the USB port of the electronic device is set based on an answer to the query.

In step S7, the display resolution is adjusted to FHD, and the version of the USB port on the display is set to USB 3.0. Herein, FHD is an abbreviation for Full High Definition, which corresponds to a display resolution of 1920×1080.

In step S8, it is determined whether another USB 3.0 device is connected to the electronic device before the current 3.0 USB device is plugged into the electronic device; the procedure is terminated in a case that another USB 3.0 device is connected to the electronic device before the current USB 3.0 device is plugged into the electronic device; or else, step S9 is executed.

In step S9, the user is queried whether he/she wishes to adjust the display resolution; step S3 is executed in a case that the user wishes to adjust the display resolution; or else, the procedure is terminated.

In practice, for avoiding disturbance and confusion associated with frequent queries or prompts, the above procedure may be executed only when the electronic device detects a USB 3.0 device for a first time, and following USB 3.0 connections may be processed based on a historical processing record for solving the initial conflict, thus a more intelligent electronic device may be provided and user satisfaction may be improved.

A Second Example

Figure 5:
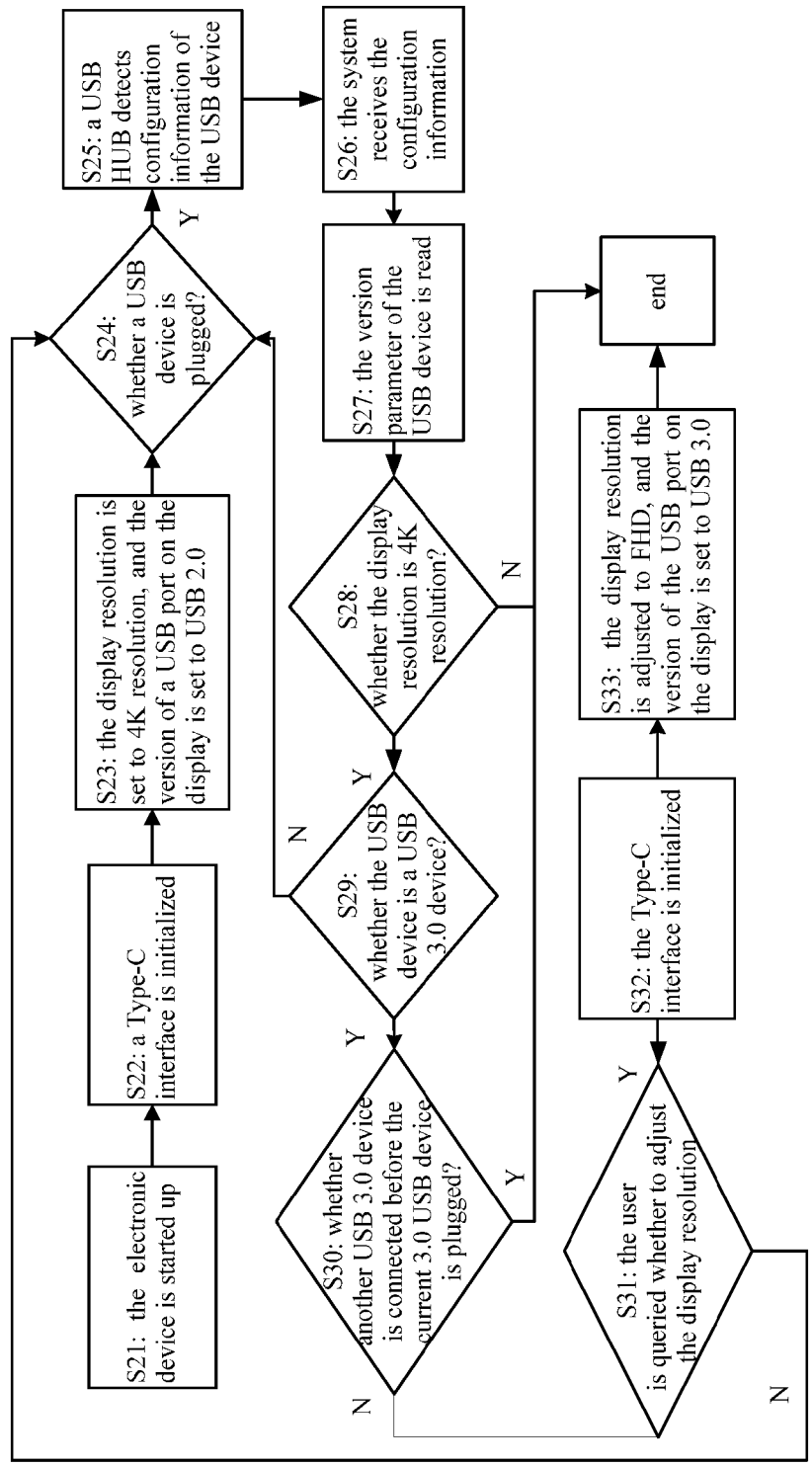
FIG. 5 is a schematic flow chart of an information processing method according to another embodiment of the disclosure.

As shown in FIG. 5, an information processing method in the example includes the following step S21 to S33.

In step S21, the electronic device is started up.

In step S22, a Type-C interface is initialized.

In step S23, the display resolution of the electronic device is set to 4K resolution, and the version of a USB port on the display of the electronic device is set to USB 2.0 by a system of the electronic device.

In step S24, it is determined whether a USB device is plugged; step S25 is executed in a case that the USB device is plugged; or else, the procedure is terminated.

In step S25, a USB HUB detects configuration information of the USB device. The USB HUB is a universal serial bus hub which may be connected with multiple USB devices.

In step S26, the system receives and parses the configuration information.

In step S27, the system reads the version parameter of the USB device from a corresponding area after parsing the configuration information.

In step S28, it is determined whether the display resolution is 4K resolution; step S29 is executed in a case that the display resolution is 4K resolution; or else, the procedure is terminated.

In step S29, it is determined whether the USB device is a USB 3.0 device; step S30 is executed in a case that the USB device is a USB 3.0 device; or else, the procedure returns back to step S24.

In step S30, it is determined whether another USB 3.0 device is connected to the electronic device before the current 3.0 USB device is plugged into the electronic device.

In step S31, the user is queried whether he/she wishes to adjust the display resolution; step S32 is executed in a case that the user wishes to adjust the display resolution; or else, the procedure returns back to step S24. By executing step S24, USB connection is continuously monitored and whether to adjust the display resolution is continuously determined.

In step S32, the Type-C interface is initialized.

In step S33, the display resolution is adjusted to FHD, and the version of the USB port on the display is set to USB 3.0. All the steps in the examples may be executed by an operating system of the electronic device. The system herein refers to an operating system.

A Third Example

Figure 6:
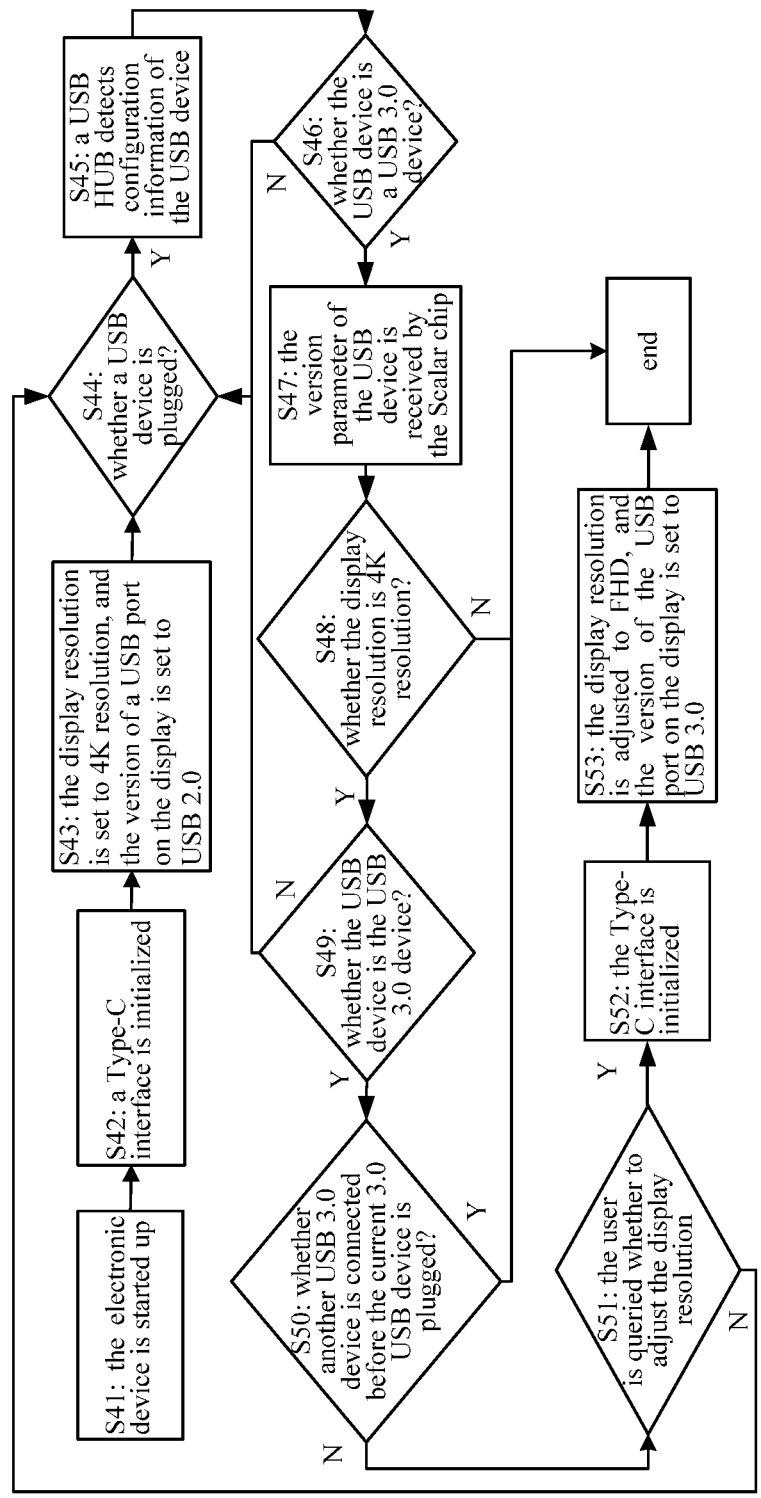
FIG. 6 is a schematic flow chart of an information processing method according to another embodiment of the disclosure.

As shown in FIG. 6, an information processing method in the example includes the following step S41 to S53.

In step S41, the electronic device is started up.

In step S42, a Type-C interface is initialized.

In step S43, the display resolution of the electronic device is set to 4K resolution, and the version of a USB port on the display of the electronic device is set to USB 2.0 by a system of the electronic device.

In step S44, it is determined whether a USB device is plugged; step S45 is executed in a case that the USB device is plugged; or else, the procedure is terminated.

In step S45, a USB HUB detects configuration information of the USB device. The USB HUB is a universal serial bus hub which may be connected with multiple USB devices.

In step S46, it is determined whether the USB device is a USB 3.0 device. In this case, the determination may be performed by an image processing module such as a Scalar chip of the display unit based on the configuration information. Step S47 is executed in a case that the USB device is the USB 3.0 device; or else, the procedure returns back to step S44. A version number of the USB device in the configuration information may be detected by a microcontroller provided in the USB HUB to determine whether the USB device is the USB 3.0 device.

In step S47, the version parameter of the USB device is received by the Scalar chip. In this case, the Scalar chip may acquire the version parameter by receiving a GPIO (General Purpose Input/Output) signal from the USB HUB.

In step S48, it is determined whether the display resolution is 4K resolution; step S49 is executed in a case that the display resolution is 4K resolution; or else, the procedure is terminated.

In step S49, it is determined whether the USB device is the USB 3.0 device; step S50 is executed in a case that the USB device is the USB 3.0 device; or else, the procedure returns back to step S44.

In step S50, it is determined whether another USB 3.0 device is connected to the electronic device before the current 3.0 USB device is plugged into the electronic device; the procedure is terminated in a case that another USB 3.0 device is connected to the electronic device before the current 3.0 USB device is plugged into the electronic device; or else, step S51 is executed.

In step S51, the user is queried whether he/she wishes to adjust the display resolution; step S52 is executed in a case that the user wishes to adjust the display resolution; or else, the procedure returns back to step S44. By executing step S44, USB connection is continuously monitored and whether to adjust the display resolution is continuously determined.

In step S52, the Type-C interface is initialized.

In step S53, the display resolution is adjusted to FHD, and the version of the USB port on the display is set to USB 3.0.

In the embodiments of the present disclosure, querying the user whether he/she wishes to adjust the display resolution may be implemented by displaying a dialog box or outputting prompt information for adjusting the display resolution, thereby implementing the interaction between the user and the electronic device, thus whether to adjust the display resolution may be determined based on a user response under the control of the user.

It should be understood that in the embodiments provided in the disclosure, the disclosed device and method may be implemented in other ways. The device embodiments described above are only for illustration. For example, the division of the unit is only a logical function division, and other division manners are possible in practice. For example, multiple units or components may be combined or integrated into another system, or some features can be omitted or not performed. Further, the illustrated or discussed coupling, direct coupling or communication connection between respective components may be the indirect coupling or communication connection implemented via some interfaces, devices or units, and may also be electrical, mechanical or other forms.

The units that are described above as a separate component may be or may not be separated physically. The component that can be displayed as a unit may be or may not be a physical unit, i.e. may be located in one position, and may be distributed among multiple network units. Some or all of the components may be selected as required for achieving the object of the solution of the embodiment.

Further, respective functional units in respective embodiments of the disclosure may be all integrated in one processing module, and may also be implemented as one unit separately, and two or more of the functional units may also be integrated into one unit. The above integrated unit may be implemented in a form of hardware, and may also be implemented in a form of hardware in addition to software functional unit.

It should be understood by those skilled in the art that all or some of the steps for implementing the above method embodiment may be implemented by hardware related to programs and instructions. The programs may be stored in a computer-readable medium, which when executed causes to perform the steps of the above method embodiment. The storage medium described above includes various medium in which programs and codes can be stored, such as mobile storage, Read-Only Memory (ROM), Random Access Memory (RAM), magnetic disk or optical disk.

The above are only embodiments of the disclosure, and the scope of protection of the disclosure is not limited thereto. Any variations or alternations that can be conceived by those skilled in the art within the scope of the technique disclosed in the disclosure fall within the scope of protection of the disclosure. Therefore, the protection scope of the disclosure should be subjected to the protection scope defined in the claims.

The invention claimed is:

1. An information processing method, comprising:
   detecting a version parameter of a first USB device connected to an electronic device;
   detecting a display resolution of the electronic device;
   determining whether the version parameter and the display resolution meet a predetermined conflict condition; and
   adjusting the display resolution of the electronic device in a case that the version parameter and the display resolution meet the predetermined conflict condition.

2. The information processing method according to claim 1, wherein the adjusting the display resolution of the electronic device in a case that the version parameter and the display resolution meet the predetermined conflict condition comprises:
   outputting prompt information for adjusting the display resolution;
   receiving a user response corresponding to the prompt information; and
   adjusting the display resolution of the electronic device based on the user response.

3. The information processing method according to claim 1, further comprising:
   determining whether a second USB device meeting the predetermined conflict condition with the display resolution is connected to the electronic device before the first USB device is connected to the electronic device; and
   maintaining the display resolution of the electronic device in a case that the second USB device meeting the predetermined conflict condition with the display resolution is connected to the electronic device before the first USB device is connected to the electronic device.

4. The information processing method according to claim 1, wherein the adjusting the display resolution of the electronic device in a case that the version parameter and the display resolution meet the predetermined conflict condition comprises:
   checking a historical processing record for the predetermined conflict condition; and
   adjusting the display resolution of the electronic device based on the historical processing record.

5. The information processing method according to claim 1, wherein
   the electronic device comprises a central processing unit and a display unit;
   the determining whether the version parameter and the display resolution meet a predetermined conflict condition comprises:
   determining, by the central processing unit, whether the version parameter and the display resolution meet the predetermined conflict condition; and
   the adjusting the display resolution of the electronic device in a case that the version parameter and the display resolution meet the predetermined conflict condition comprises:
   controlling, by the central processing unit, the display unit to adjust the display resolution in a case that the version parameter and the display resolution meet the predetermined conflict condition.

6. The information processing method according to claim 1, wherein
   the electronic device comprises a display unit, and the display unit comprises an image processing module;
   the determining whether the version parameter and the display resolution meet a predetermined conflict condition comprises:
   receiving, by the image processing module, the version parameter from an identifying sub-module and determining, by the image processing module, whether the version parameter and the display resolution meet the predetermined conflict condition; and the adjusting the display resolution of the electronic device in a case that the version parameter and the display resolution meet the predetermined conflict condition comprises:

adjusting, by the image processing module, the display resolution of the electronic device in a case that the version parameter and the display resolution meet the predetermined conflict condition.

7. The information processing method according to claim 1, wherein the electronic device comprises a display unit; and the display unit comprises a USB processing module;

the detecting a version parameter of a first USB device connected to an electronic device comprises:

reading, by a reading sub-module of the USB processing module, configuration information of the first USB device; and identifying, by an identifying sub-module of the USB processing module, the configuration information of the first USB device to acquire the version parameter of the first USB device.

8. An electronic device, comprising:

a first detecting unit configured to detect a version parameter of a first USB device connected to the electronic device;

a second detecting unit configured to detect a display resolution of the electronic device;

a first determining unit configured to determine whether the version parameter and the display resolution meet a predetermined conflict condition; and an adjusting unit configured to adjust the display resolution of the electronic device in a case that the version parameter and the display resolution meet the predetermined conflict condition.

9. The electronic device according to claim 8, wherein the adjusting unit is configured to: output prompt information for adjusting the display resolution; receive a user response corresponding to the prompt information; and adjust the display resolution of the electronic device based on the user response.

10. The electronic device according to claim 8, further comprising:

a second determining unit configured to determine whether a second USB device meeting the predetermined conflict condition with the display resolution is connected to the electronic device before the first USB device is connected to the electronic device;

wherein the adjusting unit is further configured to maintain the display resolution of the electronic device in a case that the second USB device meeting the predetermined conflict condition with the display resolution is connected to the electronic device before the first USB device is connected to the electronic device.

11. The electronic device according to claim 8, wherein the adjusting unit is configured to: check a historical processing record for the predetermined conflict condition; and adjust the display resolution of the electronic device based on the historical processing record.

12. The electronic device according to claim 8, wherein the electronic device comprises a central processing unit and a display unit; and the first determining unit comprises the central processing unit;

the central processing unit is configured to: determine whether the version parameter and the display resolution meet the predetermined conflict condition;

and control the display unit to adjust the display resolution in a case that the version parameter and the display resolution meet the predetermined conflict condition.

13. The electronic device according to claim 8, wherein the electronic device comprises a display unit; the display unit comprises an image processing module; and the first determining unit comprises the image processing module;

the image processing module is configured to: receive the version parameter from an identifying sub-module; determine whether the version parameter and the display resolution meet the predetermined conflict condition;

and adjust the display resolution of the electronic device in a case that the version parameter and the display resolution meet the predetermined conflict condition.

14. The electronic device according to claim 8, wherein the electronic device comprises a display unit; the display unit comprises a USB processing module; and the first detecting unit comprises the USB processing module;

the USB processing module comprises:

a reading sub-module configured to read configuration information of the first USB device; and an identifying sub-module configured to identify the configuration information of the first USB device to acquire the version parameter of the first USB device.

* * * * *